United States Patent
Wang et al.

(10) Patent No.: US 7,550,130 B2
(45) Date of Patent: Jun. 23, 2009

(54) METHOD FOR PRODUCING VAPOR-GROWN CARBON FIBERS HAVING 3-D LINKAGE STRUCTURE

(75) Inventors: Chun-Shan Wang, Tainan Hsien (TW);
Ya-Jen Huang, Tainan Hsien (TW);
Yen-Chu Tan, Tainan Hsien (TW);
Kai-Jen Ko, Tainan Hsien (TW);
Shih-Peng Yang, Tainan Hsien (TW)

(73) Assignee: Yonyu Plastics Co., Ltd., Tainan (TW)

( * ) Notice: Subject to any disclaimer, the term of this patent is extended or adjusted under 35 U.S.C. 154(b) by 579 days.

(21) Appl. No.: 11/286,342

(22) Filed: Nov. 25, 2005

(65) Prior Publication Data
US 2006/0147629 A1 Jul. 6, 2006

(30) Foreign Application Priority Data
Dec. 31, 2004 (TW) .............................. 93141827 A

(51) Int. Cl.
*D01C 5/00* (2006.01)
(52) U.S. Cl. ................. 423/447.3; 423/447.1; 977/743; 977/842; 977/843
(58) Field of Classification Search ............... 423/447.1, 423/447.3; 977/743, 842, 843
See application file for complete search history.

(56) References Cited

U.S. PATENT DOCUMENTS

| | | | |
|---|---|---|---|
| 6,299,812 B1 * | 10/2001 | Newman et al. | 264/176.1 |
| 6,491,789 B2 * | 12/2002 | Niu | 162/145 |
| 6,761,870 B1 * | 7/2004 | Smalley et al. | 423/447.3 |
| 6,806,397 B1 * | 10/2004 | Reilly | 585/446 |
| 6,891,724 B2 * | 5/2005 | De Lorenzo et al. | 361/704 |
| 6,965,513 B2 * | 11/2005 | Montgomery et al. | 361/687 |
| 7,157,068 B2 * | 1/2007 | Li et al. | 423/447.3 |
| 7,192,567 B1 * | 3/2007 | Reilly | 423/447.1 |
| 2003/0004058 A1 * | 1/2003 | Li et al. | 502/258 |
| 2003/0077515 A1 * | 4/2003 | Chen et al. | 429/231.8 |
| 2003/0118727 A1 | 6/2003 | Ting et al. | |

(Continued)

FOREIGN PATENT DOCUMENTS

JP 2004119386 4/2004

OTHER PUBLICATIONS

Satishkumar, et al., Single-walled nanotubes by the pyrolysis of acetylene-organometallic mixtures, Chemical Physics Letters 1998; 293: 47-52.*

(Continued)

*Primary Examiner*—Edward M. Johnson
*Assistant Examiner*—Daniel C. McCracken
(74) *Attorney, Agent, or Firm*—Rosenberg, Klein & Lee

(57) ABSTRACT

A method for producing vapor-grown carbon fibers (VGCF) having a three-dimensional linkage structure is disclosed. The method includes directly delivering heterogeneous catalysts dissolved in a liquid hydrocarbon raw material into a reaction chamber so as to continuously grow vapor-grown carbon fibers having a three-dimensional linkage structure without additional treatment. The method adopts a fluidized bed method, wherein a raw material solution consisting of a hydrocarbon compound, ferrocene ($Fe(C_5H_5)_2$), thiophene and an organometalic (non-iron) compound is vaporized by preheat. Thereafter, the raw material gas and hydrogen gas are injected into a tubular reactor and pyrolized to produce vapor-grown carbon fibers with 3-D linkage structure.

12 Claims, 2 Drawing Sheets

U.S. PATENT DOCUMENTS

2004/0241439 A1* 12/2004 Morita et al. ............... 428/364

OTHER PUBLICATIONS

Kamalakaran, et al., Synthesis of thick and crystalline nanotube arrays by spray pyrolysis, Applied Physics Letters 2000; 77(21): 3385-3387.*

Nagaraju, et al., Alumina and silica supported metal catalysts for the production of carbon nanotubes, J. Molec. Catalysis A: Chemical 2002; 181: 57-62.*

Kukovecz, et al., Catalytic synthesis of carbon nanotubes over Co, Fe and Ni containing conventional and sol-gel silica-aluminas, Phys. Chem. Chem. Phys. 2000; 2: 3071-3076.*

* cited by examiner

METHOD FOR PRODUCING VAPOR-GROWN CARBON FIBERS HAVING 3-D LINKAGE STRUCTURE

RELATED APPLICATIONS

The present application is based on, and claims priority from, Taiwan Application Serial Number 93141827, filed on Dec. 31, 2004, the disclosure of which is hereby incorporated by reference herein in its entirety.

FIELD OF THE INVENTION

The present invention relates to a method for producing vapor-grown carbon fibers (VGCF), and more particularly, to an in-situ method for directly producing the VGCF having a three-dimensional (3-D) linkage structure, wherein no subsequent treatments are needed for obtaining the VGCF having the three-dimensional linkage structure.

BACKGROUND OF THE INVENTION

VGCF has excellent material properties of a unique onion-ring micro-structure, a high aspect ratio, a high thermal-conductive coefficient, a low thermal-expansion coefficient, high strength, high modulus and high corrosion resistance. In addition, carbon fibers made by the vapor-grown method can have the structure similar to the single-crystal graphite structure, thereby forming excellent multi-wall carbon tubes having excellent electrical conductivity, wherein the thermal conductivity thereof is better than that of the thermally-conductive material such as copper or aluminum. The success of VGCF study has added quite an important technique to the carbon fiber industry in which OPCF (Organic Precursor Carbon Fibers) such as PAN, Pitch carbon fibers have been used mainly quite a long time.

The VGCF technique mainly uses low hydrocarbon compounds as raw material (carbon source) having pyrolysis reaction in reductive carrier gas (H2) atmosphere, thus directly forming VGCF via the special catalysis of transition metals such as iron, nickel or cobalt by using ultra-fine nanoparticles thereof as nucleation, wherein the reaction temperature is between 800° C. and 1300° C. The VGCF fabrication technique has the advantage that the fabrication skill is simple and does not need to perform the steps of spinning, pre-oxidation, carbonization, etc. required in the OPCF fabrication technique, so that the VGCF fabrication technique can form carbon fibers directly from cheap low-hydrocarbon material via pyrolysis and catalysis.

Conventional vapor-grown carbon fibers (VGCF) are generally formed in linear one-dimensional structures, or very few of them are the products having two-dimensional structures such as T-shaped or Y-shaped structures. In comparison with one-dimensional or two-dimensional structures, the VGCF with three-dimensional structures can further enhance the properties of strength, electrical and thermal conductivities for the composite materials made thereof. Therefore, the conventional methods for fabricating the VGCF with three-dimensional structures are, for example, Taiwan Patent Publication No. 552156 is dedicated to growing the VGCF having more T-shaped or Y-shaped branched structures on a substrate; and Japan Patent Publication No. 2004-119386 suggests converting the VGCF with one-dimensional structures to the VGCF with three-dimensional (linkage) structures by attaching asphalt to one-dimensional VGCF and then performing special treatments such as carbonizing. However, the former is restricted to the use of substrate and is difficult for mass production, and the latter has to perform additional treatments after forming the VGCF, thus having the disadvantages of increased production cost and lowered production efficiency and product performance.

Hence, there is a need to develop an effective method for directly and continuously producing VGCF having a three-dimensional linkage structure with no additional treatments needed, thus promoting production efficiency; lowering production cost; and benefiting mass production.

SUMMARY OF THE INVENTION

In one aspect, the present invention provides a method for producing vapor-grown carbon fibers (VGCF) having a three-dimensional linkage structure, for directly growing carbon fibers having the three-dimensional linkage structure via vapor phase without additional treatments, so as to promote production efficiency; lower production cost; and benefit mass production.

In another aspect, the present invention provides a method for producing vapor-grown carbon fibers (VGCF) having a three-dimensional linkage structure, for enhancing the properties of strength, electrical and thermal conductivities for the composite materials made thereof.

According to the aforementioned aspects, a method for producing vapor-grown carbon fibers (VGCF) having a three-dimensional linkage structure is provided, for directly growing carbon fibers having the three-dimensional linkage structure via vapor phase.

According to a preferred embodiment of the present invention, the method for producing vapor-grown carbon fibers (VGCF) comprises the following steps. At first, raw material solution is prepared, wherein the raw material solution comprises a hydrocarbon compound, ferrocene ($Fe(C_5H_5)_2$), thiophene and a non-iron organometalic compound (such as aluminum isopropoxide). Thereafter, the raw material solution is delivered into a preheater and vaporized as raw material gas, wherein the content of the ferrocene in raw material gas (solution) is between about 0.1 wt % and about 10 wt %, and the content of the thiophene in the raw material gas (solution) is between about 0.1 wt % and about 5 wt %, and the content of the non-iron organometalic compound in the raw material gas (solution) is between about 0.1 wt % and about 5 wt %. The raw material gas is then introduced with hydrogen gas into a tubular reactor for performing a pyrolysis reaction, thereby producing the VGCF having a three-dimensional linkage structure.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENT

The present invention is featured in dissolving heterogeneous catalysts (such as a catalyst mixture of aluminum isopropoxide, ferrocene (Fe(C$_5$H$_5$)$_2$) and thiophene) in a liquid hydrocarbon raw material so as to form raw material solution; then preheating and vaporizing the raw material solution; and thereafter delivering the vaporized raw material with hydrogen gas into a tubular reactor for performing a pyrolysis reaction, thereby directly and continuously producing the VGCF having a three-dimensional linkage structure without subsequent treatment additionally. In other words, the present invention has found that the VGCF having a three-dimensional linkage structure can be directly and continuously formed by directly dissolving a heterogeneous catalyst in a liquid hydrocarbon raw material for performing a pyrolysis reaction, wherein the heterogeneous catalyst is formed by mixing a reactive catalyst (a non-iron organometalic compound such as aluminum isopropoxide) with ferrocene and thiophene etc.

Figure 1:
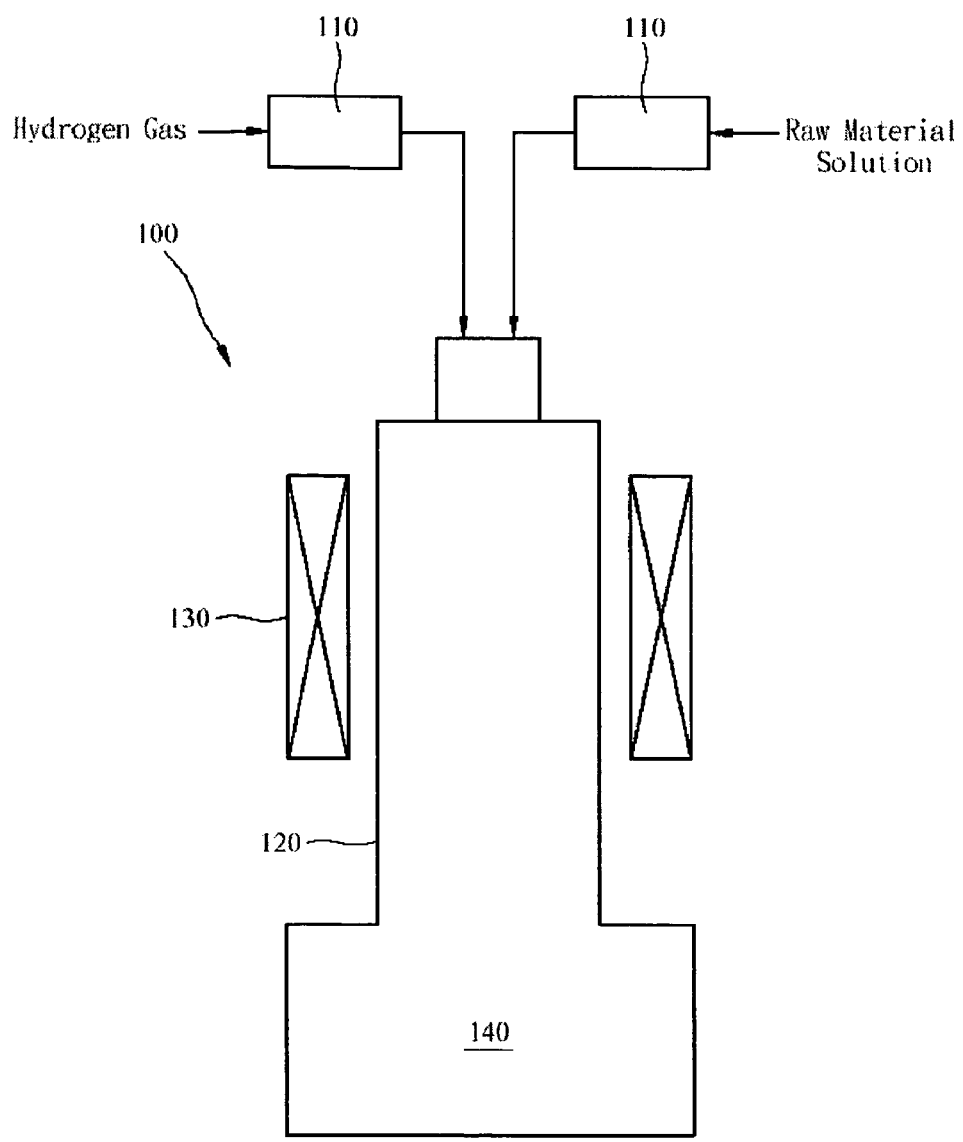
FIG. 1 is a schematic diagram showing a VGCF reaction apparatus adopted for explaining a preferred embodiment of the present invention.

Referring FIG. 1, FIG. 1 is a schematic diagram showing a VGCF reaction apparatus adopted for explaining a preferred embodiment of the present invention, wherein a reaction tube apparatus 100 is composed of a tubular reactor 120 and a heater 130. The method adopts a fluidized bed method, and a raw material solution is first prepared by mixing a hydrocarbon compound, ferrocene (Fe(C$_5$H$_5$)$_2$), thiophene and a non-iron organometalic compound (such as aluminum isopropoxide), wherein the content of the ferrocene in raw material solution is between about 0.1 wt % and about 10 wt %, and the content of the thiophene in the raw material solution is between about 0.1 wt % and about 5 wt %, and the content of the non-iron organometalic compound in the raw material solution is between about 0.1 wt % and about 5 wt %. The hydrocarbon compound of the present invention can be an aliphatic hydrocarbon compound, an aromatic hydrocarbon compound or a combination thereof, wherein the aliphatic hydrocarbon can be methane, ethylene, styrene, acetylene, propane, liquefied petroleum gas, butane, butene, butadiene or a combination thereof; the aromatic hydrocarbons can be benzene, toluene, xylene, styrene or a combination thereof. The non-iron organometalic compound of the present invention can be an organic aluminum (Al) compound, an organic stannum (Sn) compound, an organic chromium (Cr) compound, an organic titanium (Ti) compound, an organic zirconium (Zr) compound, an organic tungsten (W) compound, an organic vanadium (V) compound, an organic molybdenum (Mo) compound or a combination thereof, wherein the organic aluminum compound can be such as aluminum isopropoxide; the organic stannum compound can be such as stannic tert-butoxide; the organic titanium compound can be such as titanium isopropoxide or titanium tetrabutoxide; the organic zirconium compound can be such as zirconium acetylacetonate; the organic chromium (Cr) compound can be such as chromocene; and the organic vanadium compound can be such as vanadyl acetylacetonate.

Thereafter, the raw material solution enters a preheater 110 for vaporization so as to form raw material gas, wherein the preheating temperature in the preheater 110 is about 400° C. Then, the raw material gas and hydrogen gas are delivered into the tubular reactor for performing a pyrolysis reaction, wherein the flow rate of the raw material solution is between about 2 ml/min and about 400 ml/min, and the flow rate of the hydrogen gas is between about 20 ml/min and about 400 l/min. After the raw material gas and the hydrogen gas are introduced into the tubular reactor 120, the heat generated by the heater 130 is transmitted to the mixture gas of the raw material gas and the hydrogen gas for raising the temperature of the mixture gas to cause the raw material gas and the hydrogen gas to generate a pyrolysis reaction, thereby forming carbon fibers, wherein the reaction temperature of the pyrolysis reaction is between about 600° C. and about 1400° C. Subsequently, the carbon fibers formed fall into a collection bin 140, wherein the lengths of the carbon fibers formed are between about 0.1 μm and about 10 cm, and the diameters thereof are between about 1 nm and 10 μm. Further, the tube diameter of the tubular reactor 120 is between about 1 inch and about 12 inch, and the material thereof can be such as aluminum oxide, silicon carbide, quartz, mullite or silicon nitride, and the shape thereof can be another shape such as a square tube. The aforementioned raw materials, flow rates and temperature all are merely stated as examples for explanation, and the present invention is also applicable to other proper raw materials, flow rates and temperature, so that the present invention is not limited thereto.

A preferred embodiment is described in the below for further explaining the present invention.

At first, a raw material solution is prepared, wherein the compositions of the raw material solution are: xylene, 2 wt % ferrocene, 1 wt % thiophene and 0.5 wt % aluminum isopropoxide. Then, the raw material solution is delivered into a preheater of 400° C. at the flow rate of 30 ml/min, and thus is vaporized as raw material gas. Thereafter, the raw material gas and hydrogen gas (at the flow rate of 30 l/min) are introduced into a tubular reactor for performing a pyrolysis reaction (with the reaction temperature of 1200° C.), and thus the vapor-grown carbon fibers (VGCF) having a three-dimensional linage structure are formed. The tubular reactor adopted in the present embodiment is an aluminum oxide tube with a tube diameter of 6 inch and a length of 150 cm.

Figure 2:
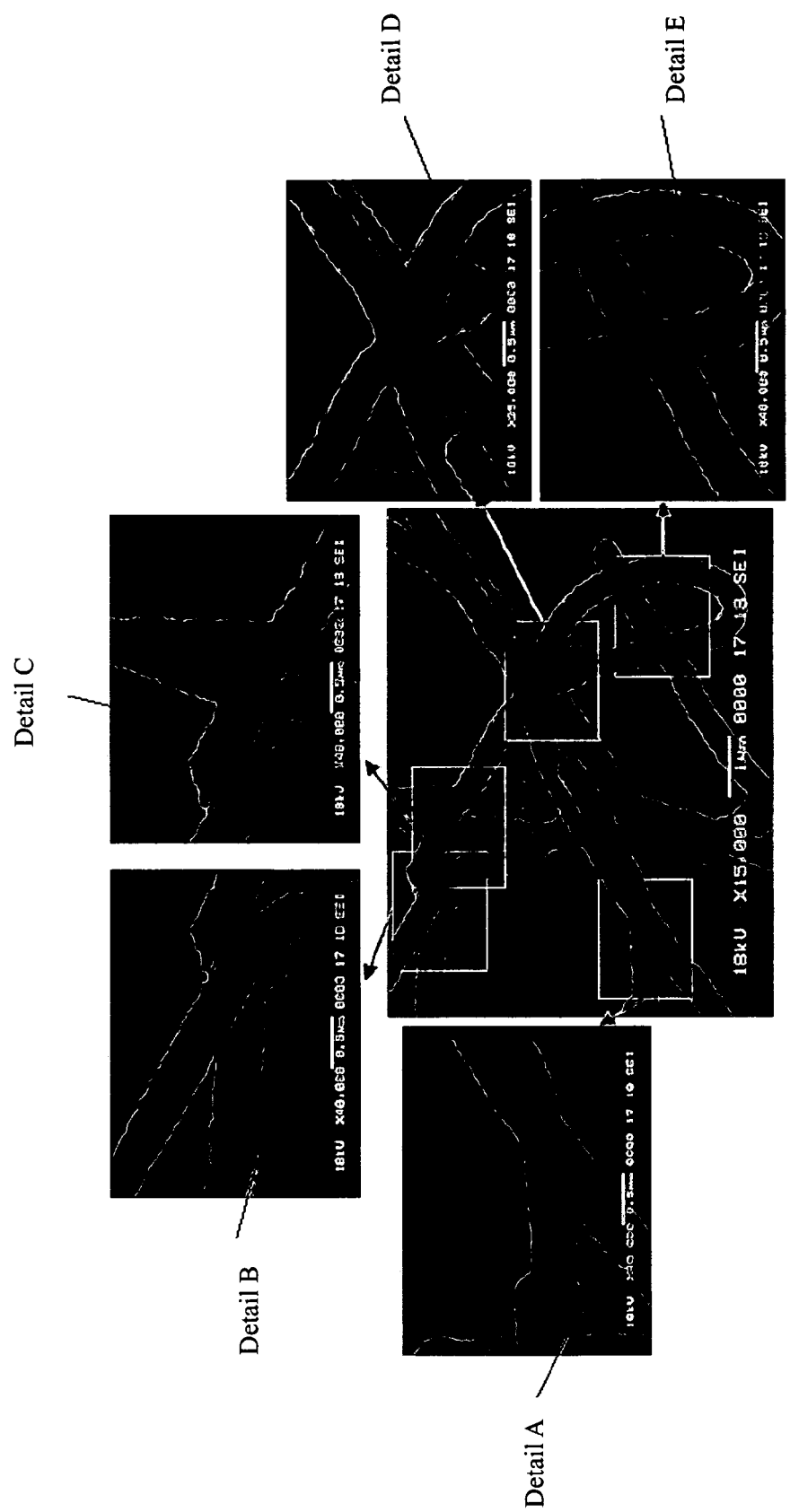
FIG. 2 shows SEM diagrams the product manufactured in accordance with the preferred embodiment of the present invention.

Referring to FIG. 2, FIG. 2 shows SEM diagrams of the products manufactured in accordance with the aforementioned preferred embodiment of the present invention. It can be known from Detail A to Detail D shown in FIG. 2, the products formed by the present preferred embodiment have excellent three-dimensional linkage structures.

Hence, it can be known from the aforementioned embodiments that the present invention has the advantages of directly growing carbon fibers having a three-dimensional linkage structure via vapor phase without additional treatments needed, thus effectively promoting production efficiency and lowering production cost and benefiting mass production; and greatly enhancing the properties of strength, electrical and thermal conductivities for the composite materials made of the VGCF formed by the present invention.

Moreover, the VGCF with 3-D linkage structure of the present invention is particularly useful in fabricating various composite products. For example, the VGCF of the present invention can be used in forming a resin-matrix composite material, thereby overcoming the filler's linkage problems existing in the conventional resin-matrix composite material; and promoting the tensile modulus, tensile strength and bending strength of the resin-matrix composite material. The VGCF of the present invention also can be used in forming a thermal grease (or thermal pad), thereby overcoming the discontinuity problems of carbons used in the conventional thermal grease (or thermal pad); and promoting thermal conductivity of the thermal grease (or thermal pad). The VGCF of the present invention also can be used in forming a coating material for obtaining better electrical conductivity. The VGCF of the present invention also can be used in forming a bipolar plate composition used in a fuel cell, thereby promoting the electrical conductivity, thermal conductivity, mechanical properties and formability of the bipolar plate composition. The following description is provided for describing the fabrications of resin-matrix composite material, thermal grease, thermal pad, electrical conductive coating material and bipolar plate composition respectively.

Fabrication of Resin-Matrix Composite Material

After VGCF with 3-D linkage structure is directly formed in accordance with the method disclosed in the present invention, the VGCF is dispersed in a liquid organic solvent by shaking or agitation, wherein the length of the VGCF is preferably between about 0.1 μm and about 1000 μm, and the diameter thereof is preferably between about 1 nm and 1 μm, more preferably 0.1 μm-1 μm; and the boiling point of the liquid organic solvent is preferably 60-150° C., such as methanol, ethanol, acetone and methyl ethyl ketone, etc. Then, a thermosetting resin and a curing agent are added and fully dissolved in the liquid organic solvent under continuous shaking or agitation to form a vanish containing VGCF suspension, wherein the content of the liquid organic solvent in the vanish is between about 40 wt % and about 95 wt %, and the content of the thermosetting resin in the vanish is between about 5 wt % and about 60 wt %, and the weight ratio of the curing agent to the thermosetting resin is between about 0.01 and about 1.0. The thermosetting resin can be such as epoxy resin, vinylester resin, phenolic resin, urea formaldehyde resin, unsaturated polyester resin, polyurethane resin and cyanate ester resin, etc. The curing agent can be such as diaminodiphenylmethane, hexamethylentetramine or benzoyl peroxide, etc. wherein the use of the curing agents depends on the curing agent adopted. Thereafter, a piece of fiber cloth is impregnated with the vanish for about 0.1-1 minute, and then is taken out for drying to prepare a prepreg, which then undergoes a high-temperature curing process to form the high performance resin-matrix composite material of the present invention, wherein the high-temperature step can be performed in one single step or multiple steps. The fiber cloth can be carbon fiber cloth, glass fiber cloth, aramid fiber cloth, nylon fiber cloth and polyester fiber cloth, etc.

Fabrication of Thermal Grease

After VGCF with 3-D linkage structure is directly formed in accordance with the method disclosed in the present invention, the VGCF is delivered into a graphitization furnace, wherein the length of the VGCF is preferably between about 0.1 μm and about 10 cm, more preferably 1 μm-100 μm; and the diameter thereof is preferably between about 0.01 μm and 10 μm, more preferably 0.1 μm-1 μm. Then, the VGCF is graphitized in the graphitization furnace under inert atmosphere (such as argon) and 2400° C.-3000° C. Thereafter, an activation step is performed onto the VGCF, thereby activating the surface of the VGCF, wherein the activation step can be a physical method such as a plasma treatment, or a chemical method such as an acid-washing step. Then, the VGCF treated is mixed with a coupling agent and a drying step is performed, thereby obtaining a mixture, wherein the coupling agent can be such as a sliane-based, aluminum-based or titanium-based coupling agent, and the content of the coupling agent in the thermal grease is between about 0.5 wt % and about 5 wt %. Thereafter, the mixture and a particulate additive are added to a matrix material, and are dispersed uniformly, so as to obtain the highly thermal conductive grease of the present invention, wherein the matrix material is a low viscosity matrix, and the viscosity thereof is between about 50 cps and about 50000 cps under 25° C., such as silicon oil, silicon grease, polyethylene glycol (PEG) or polypropylene glycol (PPG), etc. The content of the matrix material in the thermal grease is between about 10 wt % and about 30 wt %, and the content of the particulate additive in the thermal grease is between about 65 wt % and about 89 wt %, and the content of the mixture of the VGCF and the coupling agent in the thermal grease is between about 0.5 wt % and about 9 wt %. The particulate additive can be the particles with good thermal and electrical conductivities, such as Cu, Ag, Al, Mesophase Graphite Powder or graphite powders, etc., or the particles with good thermal but poor electrical conductivities, such as AlN, ZnO, $Al_2O_3$, or $TiO_2$, etc.

Fabrication of Thermal Pad

After VGCF with 3-D linkage structure is directly formed in accordance with the method disclosed in the present invention, the VGCF is delivered into a graphitization furnace, wherein the length of the VGCF is preferably between about 0.1 μm and about 10 cm, more preferably 1 μm-100 μm; and the diameter thereof is preferably between about 0.01 μm and 10 μm, more preferably 0.1 μm-1 μm. Then, the VGCF is graphitized in the graphitization furnace under inert atmosphere (such as argon) and 2400° C.-3000° C. Thereafter, an activation step is performed onto the VGCF, thereby activating the surface of the VGCF, wherein the activation step can be a physical method such as a plasma treatment, or a chemical method such as an acid-washing step. Then, the VGCF treated is mixed with a coupling agent and a drying step is performed, thereby obtaining a mixture, wherein the coupling agent can be such as a sliane-based, aluminum-based or titanium-based coupling agent, and the content of the coupling agent in the thermal grease is between about 0.5 wt % and about 5 wt %. Thereafter, the mixture and a filler are added to a matrix material composed of ethylene-vinylacetate (EVA) and silicone elastomer, and thus an admixture is formed. After the admixture is disposed in a mixer for performing a mixing step for 30 minutes, the admixture is pressed by a thermal presser, thereby obtaining the highly conductive thermal pad of the present invention with a predetermined thickness. The content of EVA in the matrix material is between about 10 wt % and about 70 wt %, and can be adjusted to determine the hardness of the thermal pad. The content of the mixture of the VGCF and the coupling agent in the thermal grease is between about 0.5 wt % and about 10 wt %. The filler can be the particles with good thermal and electrical conductivities, such as Cu, Ag, Al, Mesophase Graphite Powder or graphite powders, etc., or the particles with good thermal but poor electrical conductivities, such as AlN, BN, $Al_2O_3$, or $TiO_2$, etc., and the weight ratio of the matrix material to the filler is between about 1:1 to about 1:4.

Fabrication of Electrical Conductive Coating Material

After VGCF with 3-D linkage structure is directly formed in accordance with the method disclosed in the present invention, the VGCF is delivered into a graphitization furnace, wherein the length of the VGCF is preferably between about 1 μm and about 100 μm, more preferably 10 m-200 μm; and the aspect ratio (length to diameter) thereof is preferably between about 10 and 1000, more preferably 100-800. Then, the VGCF is graphitized in the graphitization furnace under inert atmosphere (such as argon) and 2400° C.-3000° C. Thereafter, an activation step is performed onto the VGCF, thereby activating the surface of the VGCF, wherein the activation step can be a physical method such as a plasma treatment, or a chemical method such as an acid-washing step. Then, the VGCF treated is added to a polymer matrix, and are dispersed uniformly, so as to obtain the conductive coating material of the present invention, wherein the polymer matrix is a low viscosity matrix, and the viscosity thereof is between about 50 cps and about 30000 cps under 25° C., such as phenolic, asphalt, alkyd resin, amino resin, nitrocellulose, cellulose ester, cellulose ether, perchloroethylene resin, acrylic resin, polyester resin, epoxy resin, polyurethane or a combination thereof. The content of the VGCF in the conductive coating material is preferably smaller than about 10 wt % and greater than about 1 wt %, and the content of the polymer matrix in the conductive coating material is preferably smaller than about 99 wt % and greater than about 90 wt %.

Fabrication of Bipolar Plate Composition

After VGCF with 3-D linkage structure is directly formed in accordance with the method disclosed in the present invention, the VGCF is delivered into a graphitization furnace, wherein the length of the VGCF is preferably between about 0.1 μm and about 10 cm, more preferably 1 μm-100 μm; and the diameter thereof is preferably between about 0.01 μm and 10 μm, more preferably 0.1 μm-1 μm. Then, the VGCF is graphitized in the graphitization furnace under inert atmosphere (such as argon) and 2400° C.-3000° C. Thereafter, graphite and binder are added to the graphitized VGCF so as to form a mixture uniformly. Then, a high-temperature curing step is performed onto the mixture for obtaining a bipolar plate used in a fuel cell, wherein the high-temperature step can be performed in one single step or multiple steps. As to the contents of the bipolar plate composition, the content of the VGCF is smaller than about 20 wt % and greater than 0 wt %; that of the binder is between about 10 wt % and about 50%. The binder can be a thermosetting or thermoplastic resin, wherein the thermosetting resin can be such as epoxy resin, vinylester resin, phenolic resin, urea formaldehyde resin, unsaturated polyester resin, polyurethane resin or cyanate ester resin, etc., and the thermoplastic resin can be such as acrylonitrile butadine styrene (ABS), polypropylene (PP), polyethylene terephthalate (PET), polycarbonate (PC), polyether ether ketone (PEEK), polyamide (Nylon), polystyrene (PS), polyphenylene oxide (PPO), modified polyphenylene oxide (m-PPO), polyphthalamide (PPA), polyphenylene sulfide (PPS), liquid crystal polymer (LCP), etc., or a combination thereof. The binder can further include a curing agent, wherein the content of the curing agent in the binder is between about 0.1 Phr (Parts per hundred Resin) and about 5 Phr, and the curing agent can be such as diaminodiphenylmethane, hexamethylentetramine or benzoyl peroxide, etc. wherein the use of the curing agents depends on the curing agent adopted.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A method for producing vapor-grown carbon fibers (VGCF) having a three-dimensional linkage structure, said method comprising:

mixing a hydrocarbon compound and a heterogeneous catalyst comprising ferrocene ($Fe(C_5H_5)_2$) and an organic aluminum (Al) compound, thereby preparing raw material solution;

vaporizing said raw material solution by using a preheater, thereby forming raw material gas; and introducing said raw material gas and hydrogen gas into a tubular reactor for performing a pyrolysis reaction, thereby producing said VGCF having said three-dimensional linkage structure.

2. The method of claim 1, wherein the content of said ferrocene in said raw material gas is substantially between 0.1 wt % and 10 wt %.

3. The method of claim 1, wherein the content of said organic aluminum compound in said raw material gas is substantially between 0.1 wt % and 5 wt %.

4. The method of claim 1, wherein the reaction temperature of said pyrolysis reaction is substantially between 600° C. and 1400° C.

5. The method of claim 1, wherein the flow rate of said hydrogen gas is substantially between 20 ml/min and 400 l/mm.

6. The method of claim 1, wherein said hydrocarbon compound is selected from the group consisting of an aliphatic hydrocarbon compound, an aromatic hydrocarbon compound and a combination thereof.

7. The method of claim 6, wherein said aliphatic hydrocarbon is selected from the group consisting of methane, ethylene, styrene, acetylene, propane, liquefied petroleum gas, butane, butene, butadiene and a combination thereof.

8. The method of claim 6, wherein said aromatic hydrocarbons is selected from the group consisting of benzene, toluene, xylene and a combination thereof.

9. The method of claim 1, wherein said organic aluminum compound is aluminum isopropoxide.

10. The method of claim 1, wherein said raw material gas comprises thiophene.

11. The method of claim 10, wherein the content of said thiophene in said raw material gas is substantially between 0.1 wt % and 5 wt %.

12. The method of claim 1, wherein the flow rate of said raw material solution is substantially between 2 ml/min and 400 ml/min.

* * * * *